US 8,254,374 B2

(12) United States Patent
Henneke et al.

(10) Patent No.: US 8,254,374 B2
(45) Date of Patent: Aug. 28, 2012

(54) METHOD FOR SETTING UP A COMMUNICATION CONNECTION AND PRIVATE BRANCH EXCHANGE FOR CARRYING OUT THE METHOD

(75) Inventors: Dietmar Henneke, Neuss (DE); Thorsten Baik, Monchengladbach (DE); Frank Boyle, Denver, CO (US); Frank Rodewald, Bedburg (DE)

(73) Assignee: Avaya Inc., Basking Ridge, NJ (US)

( * ) Notice: Subject to any disclaimer, the term of this patent is extended or adjusted under 35 U.S.C. 154(b) by 1000 days.

(21) Appl. No.: 12/234,917

(22) Filed: Sep. 22, 2008

(65) Prior Publication Data

US 2009/0086723 A1   Apr. 2, 2009

(30) Foreign Application Priority Data

Sep. 24, 2007 (EP) .................................. 07018709

(51) Int. Cl.
 *H04L 12/66* (2006.01)
(52) U.S. Cl. ........................................ 370/352; 370/354
(58) Field of Classification Search .................. None
 See application file for complete search history.

(56) References Cited

U.S. PATENT DOCUMENTS

| | | | |
|---|---|---|---|
| 6,453,034 B1* | 9/2002 | Donovan et al. ......... | 379/220.01 |
| 6,819,665 B1* | 11/2004 | Pinard et al. ................. | 370/352 |
| 7,002,912 B2* | 2/2006 | Wengrovitz ................. | 370/230 |
| 7,546,125 B2* | 6/2009 | Sharma et al. ............... | 455/436 |
| 2003/0120813 A1* | 6/2003 | Majumdar et al. ............ | 709/247 |
| 2008/0049925 A1* | 2/2008 | Gallant et al. ............ | 379/220.01 |
| 2008/0192730 A1* | 8/2008 | Cai et al. ......................... | 370/352 |
| 2008/0267369 A1* | 10/2008 | Parlamas et al. ........... | 379/93.01 |

OTHER PUBLICATIONS

Hilt et al., "Approaches to Implementing Services in SIP Networks", Bell Labs Technology, Bell Laboratories, Murray Hill, NJ, US, vol. 9, No. 3, pp. 39-44, Published 2004.
Background of the invention of the above-captioned application (previously provided), 2008.

* cited by examiner

*Primary Examiner* — Otis L Thompson, Jr.
(74) *Attorney, Agent, or Firm* — Sheridan Ross P.C.

(57) ABSTRACT

A communication connection between a calling communications terminal and a further communications terminal, the connection setup being initiated through the exchange of an invite message and a number of acknowledgment messages between the calling communications terminal, the further communications terminal and a higher-ranking communication-management module, the connection modalities relevant for the calling communications terminal being agreed in a first connection initiation sequence between the higher-ranking communication-management module and an application-management module allocated to the calling communications terminal, and a second connection initiation sequence being provided for agreeing the connection modalities relevant for the further communications terminal between the higher-ranking communication-management module and an application-management module allocated to the further communications terminal.

5 Claims, 3 Drawing Sheets

METHOD FOR SETTING UP A COMMUNICATION CONNECTION AND PRIVATE BRANCH EXCHANGE FOR CARRYING OUT THE METHOD

FIELD OF THE INVENTION

An exemplary embodiment of this invention relates to a method for setting up a communication connection between a calling communications terminal and a further communications terminal, the connection setup being initialized through the exchange of an invite message and a number of acknowledgment messages between the calling communications terminal, the further communications terminal and a higher-ranking communication-management module, the connection modalities relevant for the calling communications terminal being agreed in a first connection initiation sequence between the higher-ranking communication-management module and an application-management module allocated to the calling communications terminal, and a second connection initiation sequence being provided for agreeing the connection modalities relevant for the further communications terminal between the higher-ranking communication-management module and an application-management module allocated to the further communications terminal. It also relates to a private branch exchange with at least one communications terminal and with an application-management module allocated to the communications terminal, by means of which, when setting up a communication connection, the connection modalities relevant for the communications terminal can be agreed with a higher-ranking communication-management module.

BACKGROUND

Such a private branch exchange and a method of the above-mentioned type for its operation are known, for example, from article V. Hilt et al., "Approaches to Implementing Services in SIP Networks", Bell Labs Technology, Bell Laboratories, Murray Hill, N.J., US, volume 9, No. 3, pages 39 to 44.

In modern telecommunication or telephone installations or systems, such as, for example, call centers, usually a multitude of telephony or communication terminals are connected with a central exchange unit, through which telecommunication connections between individual communication terminals or else of calls coming in from outside the internal communication networks, with selected telecommunications terminals. Within the framework of these telecommunication connections, voice or user data are transmitted to the respective selected communication terminal and/or from said terminal to the central exchange device and from the latter, to the respective terminal. This data transmission can take place conventionally or using the Internet Protocol. The communications terminals provided can be installed telephony or data terminals or handsets or else telephony or data terminals connected to the exchange device via a wireless communication connection.

Such private branch exchanges, in particular for call centers or contact centers, can in particular also be designed for a data transfer through multimedia applications or in particular also through the Internet protocol. In such telecommunication networks, whose communications terminals can be connected with each other and with the central exchange device in a wire-bound manner or by means of wireless technology, a user has a multitude of applications or services at his disposal, and a relatively high and complex number of secondary functions, such as, for example, acquisition of telephone rates, call release, call forwarding or the like, provided in connection with the setup of a communication connection, can be offered. Such private branch exchanges with a multitude of integrated and offered further applications or services are usually also designed as an intelligent network or as a so-called integrated multimedia system (IMS), whereby especially in such integrated multimedia systems, the users are offered voice-over-IP telephony, automatic answering functions (voice mail), multimedial message transfer, such as, for example, instant messaging (IM), so-called push-to-talk (PTT) services, conference calls (net meetings) and the like, as additional functions, applications or services. These services or applications are usually provided as part of the respective IMS by allocated data-processing systems, the execution of such functions being controlled by a higher-ranking communication-management module of the IMS, the so-called "session manager" (SM).

To manage secondary functions and connection modalities which have to be taken into account in the setup and maintenance of a communication connection between different communication terminals, such as, for example, telephone-rate monitoring, releases for the dialing of telephone numbers, the protocols to be utilized in data transfer, and the like, appropriate application-management modules, also called "application servers" (AS), are usually allocated to the individual communication terminals. These are also part of the integrated multimedia systems.

To set up a communication connection in modem private branch exchanges, the so-called session-initiation protocol (SIP) can be utilized, whereby the communication modalities are agreed, prior to setting up the communication connection properly speaking, through an appropriate data exchange between the communication terminals involved, i.e. in particular the calling communications terminal and the desired target communications terminal. In an integrated multimedia system of the above-described type, the invite message is usually transmitted, after activation of the calling communication terminal and the input of the desired target telephone number by the user, via the higher-ranking communication-management module or the session manager to the allocated application-management module in the form of a so-called invite message. After the connection modalities for the calling communications terminal, i.e., in particular releasing options and the like, have been verified by the allocated application-management module or the allocated application server, the invite message is appropriately forwarded via the session manager.

The integrated multimedia system can be designed in particular as a so-called "full-call model" system. In such systems, the application-management module or the application server is designed for verifying, in case of an invite message forwarded by the session manager or by the higher-ranking communication-management module, all modalities and connection parameters of the desired communication connection, i.e., both for the calling and for the called side, and to initiate, if necessary, appropriate reactions, such as releases or the like. In such a concept, such a full-call application server carries out the connection modalities for both the calling communications terminal and the called target communications terminal. Thus, the corresponding application server verifies and possibly carries out the necessary verifications, releases and other reactions concerning both the calling communications terminal and the target side of the desired communication connection, i.e. of the called communications terminal.

Such integrated multimedia systems based on a so-called full-call model are meanwhile relatively common, offering the possibility that the respective allocated application server, designed in the manner of a central exchange device, manages in particular communication connections internal to the organization, making use of the session-initiation protocol.

SUMMARY

However, it has turned out that in such systems, the flexibility in managing the applications and services will be restricted in particular if, making use of the before-mentioned session-initiation protocol, external or cross-location communication connections shall be managed. To enable, consequently, an extension of the functionality of integrated multimedia systems which is appropriate for such systems, too, one has increasingly applied, instead of the above-mentioned full-call model systems, so-called half-call model systems, in which the management of services, applications and connection modalities for the calling side on the one hand and for the called side on the other hand are decoupled both locally and as far as resources are concerned, thus being conceived independently of each other. The connection modalities of the calling communications terminal are, thus, managed on an application-management module or application server allocated to said calling communications terminal, whereas the management of the connection modalities for the called communications terminal, whereby in particular automatic answering functions, call forwarding functions and the like can be considered, is provided on an application-management module or application server allocated to said called communications terminal. Under appropriate circumstances, the application server allocated to the calling communications terminal and the application server allocated to the called communications terminal may be identical; on the other hand, it is, however, also possible that said application servers are installed and organized at a large distance and separately from each other.

When a connection setup is initiated in such an integrated multimedia system based on a half-call model, the invite message transmitted by the session manager to the application server allocated to the calling communications terminal is acknowledged by said application server by returning a corresponding message, after said application server has carried out the necessary authorization, authentication or release verifications and has negotiated or adjusted the remaining necessary connection modalities, as part of a first connection initiation sequence ("originating half"). Then, the session manager forwards a corresponding message in the form of an invite message to the application server allocated to the called communications terminal or to the allocated application-management module, after receipt of which the corresponding application server verifies and sets up, as part of a second connection initiation sequence, the call and connection modalities for that part of the connection parameters which concerns the called communications terminal ("terminating half"). After determination of the release and the like, the corresponding message is transmitted to the called communications terminal. After the user of the called communications terminal has taken the call, an acknowledgment message will be returned to the session manager and possibly forwarded by the latter in an appropriate manner to the first and second application servers for executing further secondary functions and the like. If required, a multiple exchange of acknowledgment messages between the before-mentioned components can be provided, until all necessary connection modalities have been agreed and the connection properly speaking can be set up. The speech paths can be switched through the application server or else directly between the terminals.

The common use of such integrated multimedia systems based on the half-call model, in which possibly different technologies, standards or protocols have to be linked with each other in an appropriate manner, requires that the communication of the individual application-management modules with the higher-ranking communication-management module takes place in compliance with standardized and exactly specified rules. In this context, in particular the sequence and order of the exchanged messages and also the reaction of an application server to a transmitted incoming message, expected by the higher-ranking communication-management module, are standardized, in order to coordinate the corresponding sequences also on different servers in an appropriate manner.

However, a multitude of integrated multimedia systems exist, in which a local exchange between communication terminals considered as so-called SIP end points and connected with the exchange device takes place through central exchange devices or so-called PBX's. In such existing systems, the central exchange device or PBX is, therefore, designed on the basis of a full-call model, making use of the SIP technology. For reasons of the above-mentioned necessary standardization of the exchanged signals, such an integrated multimedia system based on the utilization of a central exchange device or PBX can, therefore, not be used in a compound system together with systems based on the half-call model or generally by integration in a session manager based on the half-call model. In view of the increasing spread of the half-call system due to its higher flexibility in managing the services, it is, however, desirable to modernize existing private branch exchanges or networks based on a full-call model and to adapt them to the half-call technology, and this should be carried out in a particularly resource-saving manner.

One exemplary embodiment of the invention is, therefore, based on the task to provide a method for setting up a communication connection of the above-described type, i.e., in particular in a half-call environment, allowing the integration in a particularly simple and efficient way even of exchange devices or PBX's based on a full-call model as application servers or application-management modules in said half-call environment. Furthermore, a private branch exchange which is particularly appropriate for carrying out the method shall be provided.

With regard to the method, this task is solved according to the invention by adding a signal element including a control information for the second connection initiation sequence to an acknowledgment message output, as part of the first connection initiation sequence, to the higher-ranking communication-management module by the application-management module allocated to the calling communications terminal.

One exemplary embodiment of the invention is based on the consideration that an integration of existing systems designed according to the full-call model in a half-call environment is possible with a particularly high operating safety by maintaining the fundamental functionality of the full-call system, whereby, however, type and sequence of the messages exchanged with the session manager should consistently be adapted to the half-call environment. To guarantee the operating safety and also the compatibility of the systems and to consistently avoid conflicts in the connection management, a double processing of similar functions should be excluded by an appropriate system design, even if the sequences of the messages to be exchanged with the session manager are maintained. Such a possible double processing might arise when the connection modalities for the called communications terminal are processed twice, namely on the one hand in the PBX designed anyhow as a full-call system, serving as application server for the calling communications terminal, and on the other hand once more in the application server allocated to the called communications terminal.

To avoid this, the processing of the connection modalities for the called communications terminal should, therefore, be initiated in the application server allocated to the called communications terminal only if required, i.e., only if this was not yet effected by the application server of the calling communications terminal. To enable such a utilization of the resources in the second application server according to the requirements and as a function of the processing state of the connection request concerned, said second application server should be selected in an appropriate manner by a control element within the framework of the exchanged invite or acknowledgment messages. For this purpose, a corresponding signal element is specifically forwarded to the session manager and via the latter, to the further application server, by the application server allocated to the calling communications terminal in its acknowledgment message, with which it reacts, after termination of the necessary preparations, to a received invite signal. This acknowledgment message is also an invite message.

Conflicts can be avoided in a particularly efficient manner during the initiation of a connection setup by possibly, i.e. after the first application server, working in full-call mode, has carried out the connection modalities both for the calling and for the called communication user, completely suppressing the corresponding activity in the further application server allocated to the called communications terminal and exchanging only the messages necessary for the integration in the half-call environment in compliance with the protocol. For this purpose, the further application server allocated to the called communications terminal is advantageously "short-circuited" on the processing side in an appropriate manner through the signal element added to the acknowledgment message, so that immediately after receipt of a corresponding invite message on this server, the corresponding acknowledgment message is directly returned to the session manager, to avoid the processing of further functionalities.

In an alternative or additional advantageous embodiment, it can also be provided to use the application server allocated to the called communications terminal, if required, in the manner of a system designed according to the full-call model, for processing the connection modalities both for the calling and for the called side. For this purpose, this processing is advantageously interrupted, if required, at an appropriate interrupt in the application server allocated to the calling communications terminal and a signal element including a corresponding control instruction is output via the acknowledgment message to the application server allocated to the called communications terminal.

In a particularly advantageous manner, the additionally output control instruction can also be used for a resource-saving and conflict-avoiding implementation of a forwarding circuit. For this purpose, a control instruction triggering the output of a forwarding notification is advantageously transmitted via the signal element to the application-management module allocated to the rerouting communications terminal. In this way, it can in particular be guaranteed that the session manager or the higher-ranking communication-management module is involved in the message exchange concerning the forwarding circuit, so that possibly, corresponding higher-ranking control functions, such as, for example, a verification whether it is possible or admissible at all to forward the call from the originally called communications terminal, can be exercised via the session manager. The forwarding operation properly speaking will then be effected in the application-management module sending the signal element, i.e., from there, a connection to the forwarding target will be set up in the above-described manner via the session manager and the application-management module allocated to the forwarding target.

With regard to the private branch exchange, the specified task is solved by the fact that the application-management module can be selected via a signal element integrated in an acknowledgment message forwarded by the higher-ranking communication-management module.

The advantages achieved with the invention consist in particular in that a specific, requirement-dependent activation or deactivation of the individual functionalities of the respective application servers can be achieved by designing the respective application-management modules or application servers in such a way that they can be selected by a signal element integrated in an acknowledgment message or by a control instruction included therein, making use of the session-initiation protocol concept in compliance with the protocol and the standards. In this way, making use of the above-mentioned standards and, thus, safeguarding the compatibility with the used half-call systems, it is possible, on the one hand, to fulfil the expected message or signal sequence, and, on the other hand, to reliably avoid, in a manner adapted to the requirements and with high operating safety, a double or redundant execution of individual functions, which might lead to conflicts. Thus, even systems which are in fact designed according to the full-call model can be integrated in half-call concepts, making use to a great extent of existing systems or components.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The terms "a" or "an" entity refers to one or more of that entity. As such, the terms "a" (or "an"), "one or more" and "at least one" can be used interchangeably herein. It is also to be noted that the terms "comprising", "including", and "having" can be used interchangeably. The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participates in providing instructions or data to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of embodiments of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

Figure 1:
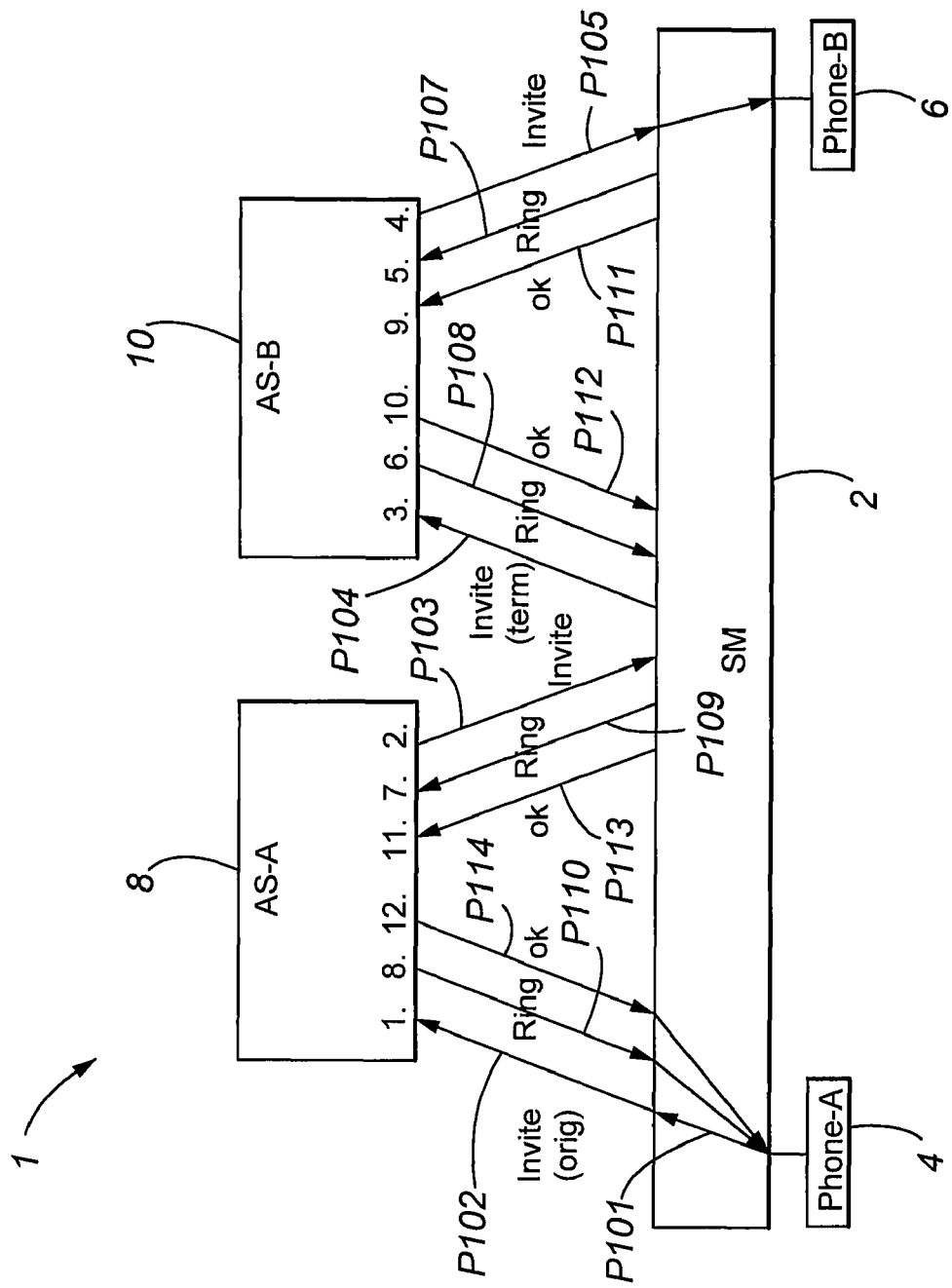
FIG. 1 illustrates an exemplary private branch exchange (PBX) according to this invention.

An exemplary embodiment of the invention will be explained in detail by means of a drawing, in which each figure shows a schematic diagram of the sequence of exchanged messages in an integrated multimedia system.

Identical parts are marked in all figures with the same reference numbers.

The private branch exchanges 1 according to the figures are in each case designed as integrated multimedia systems (IMS), in which the respective user is offered, in addition to the provision of the usual telephone functions, a multitude of further functions, applications or services, such as, for example, voice-over-IP services, automatic answering functions (voice mail), forwarding of voice, text or other multimedia messages, instant messaging (IM), telephone-rate acquisition functions or the like. The private branch exchange 1 comprises in each case a plurality of communication terminals connected in a wireless or wire-bound manner to a higher-ranking communication-management module 2, also called "session manager" (SM).

For setting up a telephone or telecommunication connection between individual communication terminals, the private branch exchange 1 is designed for using the session-initiation protocol (SIP), in which, for initiating a connection setup, a calling communications terminal, the session manager or the higher-ranking communication-management module 2 and the called communications terminal exchange an invite message and a number of acknowledgment messages, via which the connection modalities for the communication connection to be set up are negotiated. To illustrate the sequences of the exchanged messages, the messages are symbolized in the figures by corresponding arrows, the numbering of the arrows corresponding to the sequence of the messages. Furthermore, only two of the communication terminals provided, namely the calling communications terminal 4 and the called communications terminal 6, are represented in the figures.

Upon setup of a telecommunication connection as part of the session-initiation protocol, secondary functions are executed both for the calling communications terminal 4 and for the called communications terminal 6, verifying, for example, release or access authorizations, telephone-rate information or the like, executing additional functions, such as, for example, call forwarding circuits, automatic answering functions, target-release verifications and the like. For such secondary functions, a first application-management module 8, a so-called application server (AS), which can be installed, for example, on a central exchange unit or a data-processing unit of the respective private branch exchange 1, is allocated to the calling communications terminal 4. In the same way, an application-management module 10 is allocated to the called communications terminal 6, via which the corresponding secondary or additional functions for the called communications terminal 6 can be agreed and possibly executed.

In a private branch exchange 1, in which the calling communications terminal 4 and the called communications terminal 6 are provided within a uniform, preferably locally coherent compound system in a common communication network with a common exchange unit, the above-mentioned secondary or additional functions could be executed upon the setup of a communication connection both for the calling communications terminal 4 and for the called communications terminal 6 in a common, central exchange or data-processing unit. In this case, the first application-management module 8 and the second application-management module 10 coincide logically, structurally and also physically in one unit. A system designed in such a way is operated according to the so-called "full-call model", because all additional or secondary functions of the telecommunication connection to be set up are executed from one system, in a bundled and combined manner. A problem of such a system based on the full-call model is, however, its relatively restricted flexibility in integrating spatially or organizationally remote structures and in the optional connection of further terminals from units external to the location or organization.

To make the use of the session-initiation protocol accessible also for cross-location or cross-organization communication connections, in recent development the above-mentioned full-call model was increasingly replaced by the so-called half-call model, according to which also the private branch exchanges 1 of the present exemplary embodiments are designed. In such a half-call model, the first application-management module 8 or application server allocated to the calling communications terminal 4 are designed both logically and structurally independently of the second application-management module 10 allocated to the called communications terminal 6, the first application-management module 8 negotiating in a first connection initiation sequence during the initiation of a connection setup the connection modalities for the calling communications terminal 4, possibly also executing secondary functions and verifying and taken into account release specifications and the like. After in this context, a first preparatory stage (also called "originating half call") has been completed, the second application-management module 10 allocated to the called communications terminal 6 agrees in a second connection initiation sequence the connection modalities as well as the execution of secondary functions for the called communications terminal 6 (also called "terminating half call"). However, the half-call model also offers the possibility to allocate the same application-management module to the terminals 4 and 6.

The sequence of the exchange of messages during the initiation of a connection setup according to this "half-call model" of a system known as such is represented in a schematic diagram according to FIG. 1. After activation of the first communications terminal 4 by the user, i.e., for example, after picking up the receiver and inputting the desired target telephone number, the first communications terminal 4 sends as part of the session-initiation protocol an invite message symbolized through the arrow P101 to the higher-ranking communication-management module 2. The latter transmits the invite message to the first application-management module 8 or the corresponding application server allocated to the first communications terminal 4, symbolized through the arrow P102. In reaction to this incoming invite message, the before-mentioned application server executes a series of additional or secondary functions allocated to the calling communications terminal 4, verifying, for example, whether the calling party has an authorization for the desired communication connection, or the like. After completion of these first functions, the before-mentioned application server returns to the session manager or the higher-ranking communication-management module 2, in the manner of an acknowledgment, a corresponding invite message communicating that the before-mentioned functions have been executed ("orig"), which is represented through the arrow P103.

To initiate a subsequent second connection initiation sequence, the session manager then sends, as indicated by the arrow P104, a corresponding invite signal to the application-management module 10 allocated to the called communications terminal 6, which then negotiates the connection modalities for the share of the telecommunication connection related to the called communications terminal 6 ("terminating half call") and executes further additional or secondary functions, such as, for example, verification of call redirections, forwarding circuits, automatic answering functions, or the like. After this has been accomplished, the application server allocated to the called communications terminal 6 transmits a corresponding acknowledgment to the session manager, which thereupon transmits a corresponding invite signal to the called communications terminal 6, see arrows P105, P106.

To signalize the incoming call, the called communications terminal 6 starts a ringing signal or another display to draw the user's attention to the incoming call. Then, an acknowledgment of the effected notification operation is returned, as indicated by the arrows P107, P108, P109, P110, via the session manager and the before-mentioned application server, to the calling communications terminal 4 ("ring"), so that the calling user hears a ringing signal at the called communications terminal 6. As soon as the user of the called communications terminal 6 takes the call, activating the corresponding terminal in an appropriate manner, for example by picking up the receiver, the communication connection will be completed, which will also be transmitted to the calling communications terminal 4 by an appropriate sequence of acknowledgment messages, as indicated by the arrows P111, P112, P113, P114, via the session manager and the application server.

Due to the logical and functional separation of the application servers, a communication management based on this half-call model offers the advantage that telecommunication connections can be set up and managed even in a cross-system manner and independently of the location, the respective application servers being able to manage the respective shares of the communication connection independently of each other and in a way adapted to local specifications or marginal conditions. This enables the integration of the most different local systems for the setup of desired communication connections independently of location and system. However, to guarantee such a flexible integration even of different systems with high operating safety, the proper and standardized observance of the above-mentioned instruction sequences and sequences of messages in the exchange of information with the session manager or with the higher-ranking communication-management module 2 is absolutely necessary. That means that the use of a local communication network or a local communication system in an integrated multimedia system according to the principle of the connection-setup process represented in FIG. 1 presupposes that the respective system is designed and appropriate for receiving the respective incoming messages and for returning the respective acknowledgment messages in due time and form.

This aspect can have a relatively disadvantageous effect if existing communication systems shall be upgraded for operation in such a half-call model and thus for integration in increasingly spread communication standards, which are internally based on the use of a central exchange unit in the manner of a full-call model, because such a system is designed for executing the corresponding modality and additional functions both for the incoming share of the call ("originating half call") and for the called part of the communication connection ("terminating half call"). In combination with systems according to the half-call model, a double execution of functions, a double occupancy of corresponding memory areas and other conflicts may occur in a manner which is undesirable and detrimental or even inacceptable to the operation of the system as a whole.

In order to integrate, nevertheless, systems working according to the full-call model in such a compound system, consistently avoiding such conflict situations and utilizing existing resources in a particularly favourable way, it is now provided according to another exemplary embodiment of the invention to add, as a completion of the above-mentioned messages to be exchanged in the transmission of messages within the framework of the session-initiation protocol, a further signal element with which one of the before-mentioned application servers can directly select one of the other above-mentioned application servers and can directly control or modify the execution of the before-mentioned functionalities.

Figure 2:
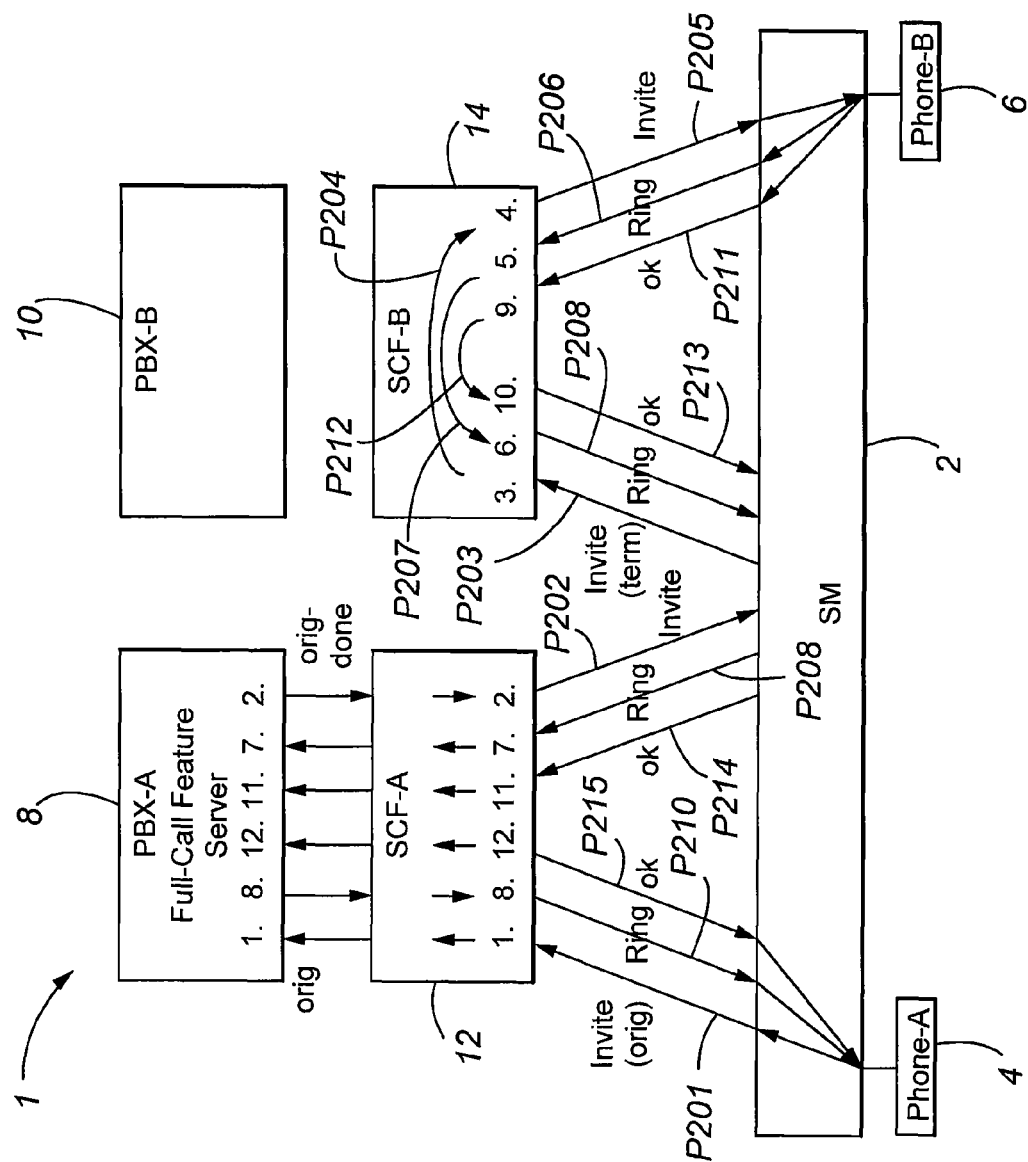
FIG. 2 illustrates another exemplary PBX with a session control module according to this invention.
Figure 3:
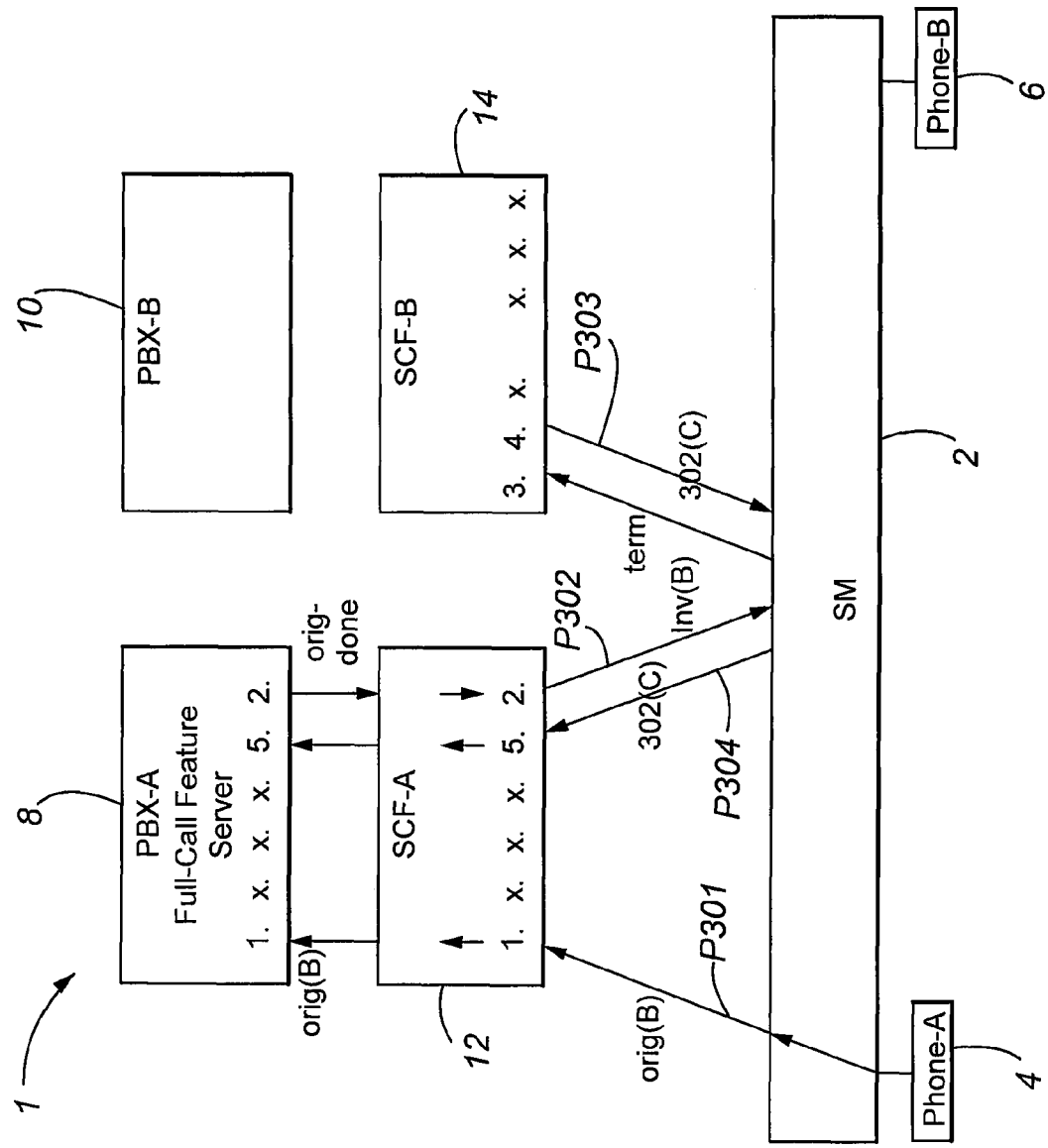
FIG. 3 illustrates another exemplary PBX with a session control module according to this invention.

Exemplary embodiments thereof are represented in FIGS. 2, 3. In these representations, a session control module 12 and 14, respectively, is connected ahead of the first application-management module 8 and the second application-management module 10, respectively, adapting the exchange of messages between the higher-ranking communication-management module 2 and the application-management module 8 or 10, respectively, according to the requirements. The respective session control module 12, 14 can be designed as an independent unit or else be integrated in the application-management module 8 or 10, respectively.

For the sequences of messages explained in the following by means of FIGS. 2, 3, it is significant that the representations show a logical and functional allocation of the respective components, in particular in view of the intended use of the application servers for executing the first and second halves of the telecommunication connection concerned. Physically or structurally, the application servers can, nevertheless, be realized by one and the same unit. The basic idea according to the invention is to integrate existing exchange units or PBX's actually working according to the full-call model as application servers in an integrated multimedia system, a half-call environment being, however, suggested to the session manager through type and sequence of the messages exchanged by each of the application servers working according to the full-call model. In this way, it is guaranteed that functionalities or additional functions will not be executed twice. The concept can be used in particular in systems, in which all, or at least some, SIP end points are allocated to an application server or a PBX. For this purpose, a further parameter or an additional signal element is transmitted in the SIP messages, with which the receiving application server is transmitted a control instruction by means of which the reaction to an incoming invite signal is determined. Preferably, the session control module 12, 14 is connected ahead of the respective PBX, so that in a simple case of a direct answer or a forwarding circuit in reaction to an incoming invite signal, this session control module 12, 14 can directly answer to the incoming signal, without the PBX connected behind being activated at all.

In the sequence of messages shown in FIG. 2, it is provided that, if required, the application-management module 10 allocated to the called communications terminal 6 is completely bypassed or "suppressed", if all connection modalities have been processed already by the application-management module 8 provided on the calling side. Upon initiation of a connection setup in such a case, the calling communications terminal 4 sends in the exemplary embodiment according to FIG. 2 an invite message symbolized through the arrow P201, via the higher-ranking communication-management module 2 to the application-management module 8 allocated to it. This invite message is first of all received by the session control module 12 and is forwarded by the latter to the application-management module 8 properly speaking, which is designed in the exemplary embodiment as a PBX according to the full-call model. Upon receipt of this invite message, the application-management module 8 executes, in the manner of a full-call system, the agreement of the connection modalities both for the calling side and for the called side as well as the additional functions, release verifications and the like for both sides. Thus, in this case, the application-management module 8 serves as a "full-call feature server" both for the calling communications terminal 4 and for the called communications terminal 6.

Then, the application-management module 8 transmits via the allocated session control module 12 an acknowledgment message, symbolized through the arrow P202, the higher-ranking communication-management module 2. This acknowledgment message contains, in addition to the usual signal elements, a further signal element including a control information stating that all necessary functions have already been executed by the application-management module 8. Accordingly, said additional signal element includes the control information "Shortcut" for the application-management module 10 allocated to the called communications terminal 6.

This additional signal element is transmitted as part of the message symbolized through the arrow P203 from the communication-management module 2 to the application-management module 10 allocated to the called communications terminal 6. The application-management module 10 is designed such that it can be controlled by the above-mentioned signal element, the session control module 14 connected ahead already recognizing, in the exemplary embodiment, that due to the transmitted signal element "Shortcut", the connection modalities for the communication connection to be set up have already been agreed in the application-management module 8 and that, therefore, they shall not be processed anew in the application-management module 10. Thus, the session control module 14 cuts short, as indicated through the arrow P204, the activation of the application-management module 10 properly speaking, to avoid a double processing, and forwards a corresponding message, indicated through the arrow P205, directly to the called communications terminal 6.

In reaction to the received invite message, the called communications terminal 6 starts ringing, which is acknowledged through a corresponding acknowledgment message, symbolized through the arrow P206, via the higher-ranking communication management module 2. This acknowledgment message is returned in the session control module 14, as indicated through the arrow P207, bypassing the application-management module 10, to the higher-ranking communication-management module 2, as indicated through the arrow P208. From there, the before-mentioned acknowledgment message, as indicated through the arrows P209 and P210, is transmitted to the called communications terminal 4 via the session control module 12 and the application-management module 8, interposing again the higher-ranking communication-management module 2, so that the user of the called communications terminal 6 hears the ringing of the terminal.

After the called user has taken the call, for example by picking up the receiver or by another appropriate activation of the called communications terminal 6, the called communications terminal 6 transmits again, via the higher-ranking communication-management module 2, a corresponding acknowledgment message to the calling communications terminal 4, as indicated through the arrows P211, P212, P213, P214, and P215. This message, too, is transmitted, as symbolized through the arrow P212, bypassing the application-management module 10 allocated to the called communications terminal 6. After transmission of this acknowledgment message to the calling communications terminal 4, the communication connection will then be completed.

Thus, in the exemplary embodiment according to FIG. 2, the application-management module 8 serves in the manner of a full-call server for executing the functionalities both for the calling communications terminal 4 and for the called communications terminal 6, it being guaranteed through transmission of an appropriate signal element or a control function for the application-management module 10 allocated to the called communications terminal 6 that said application-management module 10 is not activated. Therefore, such a structure guarantees that the application-management module 8, which by its structure is anyhow designed as a conventional PBX in the manner of a full-call model, can be addressed on the message side, making use of its functionalities, which are stored anyhow. "From the point of view" of this unit, the communication connection can, therefore, be set up within the framework of a full-call model. On the other side, the setup of the communication connection is effected, due to the above-mentioned exchange of messages, "from the point of view" of the session manager or of the higher-ranking communication-management module 2 within the framework and in compliance with the standards of a half-call model, because all messages expected and provided are exchanged duly and in an appropriate sequence with the higher-ranking communication-management module 2. It should be noted in this context that in SIP, it is allowed to insert into a communication a private signal element which has to be ignored and forwarded unchanged by all components which do not know this signal element.

The diagram shown in FIG. 3, on the other hand, represents the sequence of messages for the case that a forwarding circuit for the called communications terminal 6 has been set up. In this case, too, the application-management module 8 allocated to the calling communications terminal 4 is designed as a "full-call feature server" in the manner of a PBX, so that the call forwarding and the execution of the functionalities and the like necessary therefore could in general be executed within the application-management module 8. In view of a consistent integration into a half-call environment, this has, however, the disadvantage that such a server-internal execution of the call forwarding would take place bypassing the higher-ranking communication-management module 2 or the session manager, so that the session manager would in this case not be able at all to intervene in the set-up of the communication connection. This might, however, be necessary, for example, for the execution of additional functions or, for example, for release verifications provided for the called communications terminal 6, if it has to be verified first of all whether, for example for reasons of telephone rates or the like, the adjusted call forwarding shall be released at all.

Consequently, to consistently integrate in case of such a call forwarding the sequence of messages to be exchanged with the higher-ranking communication-management module 2 or the session manager into the provided half-call environment, the application-management module 8 returns in the exemplary embodiment according to FIG. 3, too, in reaction to an incoming invite message, an appropriate acknowledgment message extended by a corresponding signal element including a corresponding control information to the higher-ranking communication-management module 2. The control instruction transmitted thereby triggers the output of a forwarding notification, with which a "pseudocall" is triggered at the called communications terminal 6. Through this "pseudocall", the sequences of messages expected by the session manager or the higher-ranking communication-management module 2 are consistently complied with.

As represented in the exemplary embodiment according to FIG. 3 through the arrow P301, the calling communications terminal 4 sends, for initiating the connection setup, after a corresponding activation through the user and input of the target telephone number desired by him, a corresponding invite message to the allocated application-management module 8, which is forwarded by the higher-ranking communication-management module 2 via the session control module 12 to said application-management module 8. In reaction thereto, the application-management module 8, designed as a "full-call server", executes all additional functions and functionalities for setting up the connection modalities both for the caller side and for the called side.

In this context, it is noted that in the called communications terminal 6, a call forwarding to a further communications terminal, which is not represented in detail, is stored and activated. Although, consequently, all functions relating to this communications terminal 6 could immediately be executed, the further processing is provisionally interrupted and an appropriate exchange of messages adapted to a half-call environment is initiated. For this purpose, the application-management module 8 transmits a message, symbolized through the arrow P302, to the session manager or the higher-ranking communication-management module 2, which is configured as an invite message for the called communications terminal 6, in order to maintain the sequence of messages expected by the session manager within the framework of a half-call environment.

A further, proprietary signal element, designed as a control instruction for the output of a forwarding notification ("forward"), is added to this invite message. In a preferred embodiment of the invention, the target telephone number of the forwarding operation is additionally transmitted in a further proprietary signal element. Then, the session manager or the higher-ranking communication-management module 2 transmits this invite message to the session control module 14 connected ahead of the application-management module 10. On this occasion, the session manager can, if required, intervene in the further course of the communication connection (for example, initiating an abortion, if the called communications terminal 6 is not authorized to forward messages, for example for reasons of telephone rates or the like, or executing additional functions for the communications terminal 6).

In reaction to the incoming invite signal and the forwarding control instruction included therein, the application-management module 10 answers via the session control module 14 connected ahead of it, directly and without further activation of functions within the application-management module 10, through a forwarding notification in which the target telephone number of the communications terminal addressed by the forwarding operation is indicated in a standardized signal element. This is symbolized through the arrow P303, which represents in particular within the framework of the SIP protocol the message "302 moved temporarily" and may additionally include the target telephone number of the forwarding operation.

The corresponding forwarding notification is returned by the higher-ranking communication-management module 2, as indicated through the arrow P304, via the session control module 12 to the application-management module 8, so that in reaction thereto, the application-management module 8 can then continue the processing of the connection setup.

The further steps are then carried out in an appropriate manner with regard to the communications terminal to which the call was forwarded, whereby in particular for this communications terminal, again in the manner of a full-call system, all functionalities can be executed, according to the requirements. If necessary, the entire further processing is carried out by the application-management module 8, the application-management module allocated to the finally called communications terminal being correspondingly cut short.

Through the above-mentioned realizations of the sequences of messages and in particular through the transmission of a signal element including a control information for the application server, it is, therefore, possible to use existing PBX's as application servers in an IMS environment based on the half-call model, with relatively slight modifications. Redundancies and double processing, which might lead to conflicts, are consistently avoided, enabling a particularly efficient utilization of existing resources.

While the above-described techniques have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for establishing a communication connection. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. In a communications network, with one or more application servers providing full call information, and with a general communication management module communicating with half call messages with said one or more application servers, said general communication management module establishing a call between first and second communication terminals by a method comprising the steps of:
   a. originating a call from said first communication terminal;
   b. said general communication management module providing session management for said originating call and sending a call origination request to a first application server;
   c. said first application server determining full call information for said call origination request from said first communication terminal and providing to said general communication management module said full call information in a half call message;
   d. said general communication management module sending said full call information in a half call message to a second application server; and
   e. said second application server completing the call between said first and second communication terminals using said full call information,
   wherein said full call information includes originating and terminating connection parameters and control information for one or more of said first and said second application servers,
   wherein said half call message is selected from the group of a first session initiation sequence message or a second session initiation sequence message, and
   wherein a connection setup is initialized through an exchange of an invite message and a number of acknowledgment messages between said first communication terminal, said second communication terminal, and said general communication management module, connection parameters relevant for said first communication terminal being negotiated in a first connection initiation sequence between said general communication management module and said first application server, and a second connection initiation sequence being provided for negotiating connection parameters relevant for said second communication terminal between said general communication management module and said second application server, wherein as part of a first connection initiation sequence a signal element including control information for a second connection initiation sequence is added to an acknowledgment message output to said general communication management module by said first application server.

2. The method of claim 1, wherein said signal element is used to suppress a negotiation of the connection parameters relevant for said second communications terminal between said general communication management module and said second application server.

3. The method of claim 1, wherein said signal element is used to transmit a control signal to said second application server, said control signal triggering the output of a forwarding notification.

4. A communications network with one or more application servers providing full call information, and with a general communication management module communicating with half call messages with said one or more application servers, said general communication management module being set up for establishing a call between first and second communication terminals by a method comprising the steps of:
   a. originating a call from said first communication terminal;

b. said general communication management module providing session management for said originating call and sending a call origination request to a first application server;

c. said first application server determining full call information for said call origination request from said first communication terminal and providing to said general communication management module said full call information in a half call message;

d. said general communication management module sending said full call information in a half call message to a second application server; and e. said second application server completing the call between said first and second communication terminals using said full call information, wherein said full call information includes originating and terminating connection parameters and control information for one or more of said first and said second application servers, wherein said half call message is selected from the group of a first session initiation sequence message or a second session initiation sequence, and wherein a connection setup is initialized through an exchange of an invite message and a number of acknowledgment messages between said first communication terminal, said second communication terminal, and said general communication management module, the connection parameters relevant for said first communication terminal being negotiated in a first connection initiation sequence between said general communication management module and said first application server, and a second connection initiation sequence being provided for negotiating connection parameters relevant for said second communication terminal between said general communication management module and said second application server, wherein as part of said first connection initiation sequence a signal element including a control information for said second connection initiation sequence is added to an acknowledgment message output to said general communication management module by said first application server.

5. A communications network comprising:

one or more application servers providing full call information in half call messages; and a general communication management module communicating with said half call messages with said one or more application servers, said general communication management module being set up for establishing a call between first and second communication terminals, wherein at least one of said application servers can be controlled via a signal element integrated into an acknowledgment message forwarded by the general communication management module;

wherein said full call information includes originating and terminating connection parameters and control information for the one or more application servers, wherein said half call messages are selected from the group of a first session initiation sequence message or a second session initiation sequence, and wherein a connection setup is initialized through an exchange of an invite message and a number of acknowledgment messages between said first communication terminal, said second communication terminal, and said general communication management module, connection parameters relevant for said first communication terminal being negotiated in a first connection initiation sequence between said general communication management module and a first application server, and a second connection initiation sequence being provided for negotiating connection parameters relevant for said second communication terminal between said general communication management module and a second application server, wherein as part of said first connection initiation sequence a signal element including control information for said second connection initiation sequence is added to an acknowledgment message output to said general communication management module by said first application server.

* * * * *